(12) United States Patent
Seibold

(10) Patent No.: US 7,461,899 B2
(45) Date of Patent: Dec. 9, 2008

(54) RECLINER MECHANISM

(75) Inventor: Kurt A. Seibold, South Lyon, MI (US)

(73) Assignee: Johnson Controls Technology Company, Plymouth, MI (US)

(*) Notice: Subject to any disclaimer, the term of this patent is extended or adjusted under 35 U.S.C. 154(b) by 433 days.

(21) Appl. No.: 10/529,448

(22) PCT Filed: Oct. 3, 2003

(86) PCT No.: PCT/US03/31494

§ 371 (c)(1),
(2), (4) Date: Oct. 11, 2005

(87) PCT Pub. No.: WO2004/033250

PCT Pub. Date: Apr. 22, 2004

(65) Prior Publication Data

US 2006/0125303 A1    Jun. 15, 2006

Related U.S. Application Data

(60) Provisional application No. 60/416,336, filed on Oct. 4, 2002.

(51) Int. Cl.
*B60N 2/235* (2006.01)
*B60N 2/22* (2006.01)
(52) U.S. Cl. .............................. 297/367; 297/362
(58) Field of Classification Search ............ 297/367, 297/362
See application file for complete search history.

(56) References Cited

U.S. PATENT DOCUMENTS

| 2,853,121 A | * | 9/1958 | Herider et al. ............... 297/367 |
| 2,892,487 A | * | 6/1959 | Herider et al. ............... 297/461 |
| 4,035,021 A | * | 7/1977 | Krug .......................... 297/369 |
| 4,332,417 A | | 6/1982 | Mizelle |
| 4,346,933 A | | 8/1982 | Jacobs |
| 4,408,799 A | | 10/1983 | Bowman |
| 4,591,207 A | * | 5/1986 | Nithammer et al. ......... 297/366 |
| 4,795,213 A | * | 1/1989 | Bell .......................... 297/367 |
| 4,884,845 A | * | 12/1989 | Schmale et al. ............ 297/367 |
| 4,909,571 A | | 3/1990 | Vidwans et al. |
| 4,946,223 A | * | 8/1990 | Croft et al. ................. 297/367 |
| 4,971,379 A | | 11/1990 | Rumpel et al. |
| 5,100,092 A | | 3/1992 | Sovis |
| 5,109,963 A | | 5/1992 | Husted et al. |

(Continued)

*Primary Examiner*—Rodney B. White
(74) *Attorney, Agent, or Firm*—Butzel Long

(57) ABSTRACT

A recliner mechanism for a vehicle seat includes a toothed sector member secured to a seat frame and first and second pivoted pawl members each including a plurality of teeth to engage the teeth of the sector member. The first and second pawl members also each pivot on a cam pin member located at a distal end thereof, the cam pins each have a center axis and an offset axis having by a toothed cam lobe. The toothed cam lobes mesh such that rotation of one cam pin member causes the other cam pin member to totate in the opposite direction. A handle is coupled to at least one of the cam pin members to rotate the cam pin members and cause the pawl members to rotate about a pin connecting the proximal ends of the pawl members. The pawl members are movable between a first or locked position and a second or unlocked position, permitting the seat back to be adjusted with respect to the seat base against the force of a spring.

20 Claims, 8 Drawing Sheets

U.S. PATENT DOCUMENTS

| | | |
|---|---|---|
| 5,150,632 A | 9/1992 | Hein |
| 5,154,476 A | 10/1992 | Haider et al. |
| 5,156,439 A | 10/1992 | Idlani et al. |
| 5,203,608 A | 4/1993 | Tame |
| 5,205,609 A * | 4/1993 | Notta et al. ............... 297/367 |
| 5,211,445 A | 5/1993 | Husted et al. |
| 5,234,189 A | 8/1993 | Myers |
| 5,280,999 A | 1/1994 | Jones et al. |
| 5,322,346 A * | 6/1994 | Notta et al. ............... 297/367 |
| 5,328,241 A | 7/1994 | Haider |
| 5,348,373 A | 9/1994 | Stiennon |
| 5,380,060 A | 1/1995 | Sponsler et al. |
| 5,383,707 A | 1/1995 | Osenkowski et al. |
| 5,390,981 A | 2/1995 | Griswold |
| 5,393,123 A | 2/1995 | Hernandez et al. |
| 5,474,353 A | 12/1995 | Koester et al. |
| 5,498,051 A | 3/1996 | Sponsler et al. |
| 5,524,970 A | 6/1996 | Kienke et al. |
| 5,590,932 A * | 1/1997 | Olivieri .................... 297/367 |
| 5,707,035 A | 1/1998 | Kargol et al. |
| 5,813,725 A * | 9/1998 | Robinson .................... 297/367 |
| 5,865,285 A * | 2/1999 | Minkenberg et al. .... 297/366 X |
| 6,015,142 A | 1/2000 | Ulicny |
| 6,109,690 A | 8/2000 | Wu et al. |
| 6,139,104 A | 10/2000 | Brewer |
| 6,178,838 B1 * | 1/2001 | Schwarzbich ................ 74/143 |
| 6,209,955 B1 | 4/2001 | Seibold |
| 6,230,867 B1 * | 5/2001 | Schwarzbich ............. 192/223.2 |
| 6,238,002 B1 | 5/2001 | Brewer et al. |
| 6,375,245 B1 | 4/2002 | Seibold et al. |
| 6,402,248 B1 | 6/2002 | Lloyd et al. |
| 6,409,263 B1 | 6/2002 | Seibold |
| 6,427,978 B2 | 8/2002 | Plum |
| 6,488,134 B2 * | 12/2002 | Becker et al. ........... 297/367 X |
| 6,547,303 B1 | 4/2003 | Anderson |
| 6,575,278 B1 * | 6/2003 | Schumann et al. ...... 297/367 X |
| 6,575,420 B2 | 6/2003 | Yoshida et al. |
| 6,644,744 B2 | 11/2003 | Seibold |
| 6,712,430 B2 * | 3/2004 | Ito et al. .................. 297/367 X |
| 6,733,076 B2 * | 5/2004 | Grable et al. ........... 297/367 X |
| 7,069,811 B2 * | 7/2006 | Frohnhaus et al. ....... 297/367 X |

* cited by examiner

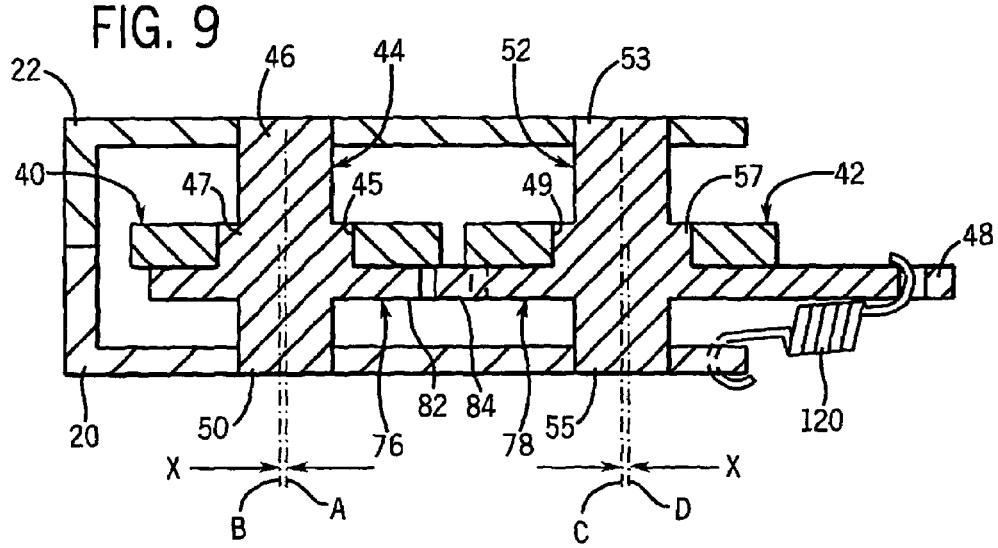
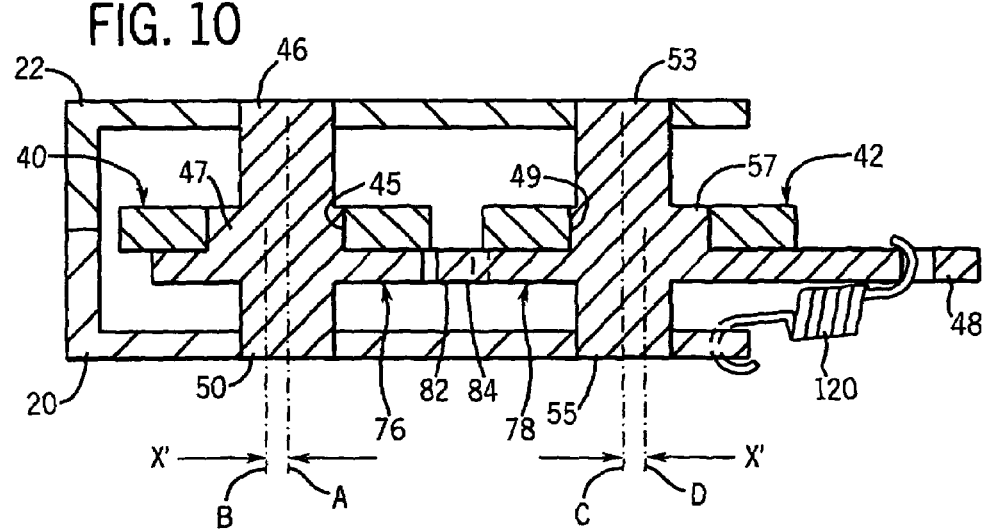

ns. More particularly, the present invention relates to a
low cost, thin profile, pawl and sector recliner mechanism for
use in adjusting the position of a seat back with respect to a
seat base.

RECLINER MECHANISM

FIELD OF THE INVENTION

The present invention relates generally to recliner mechanisms. More particularly, the present invention relates to a low cost, thin profile, pawl and sector recliner mechanism for use in adjusting the position of a seat back with respect to a seat base.

BACKGROUND OF THE INVENTION

Vehicle and other seats commonly include a recliner mechanism to adjust the position of the seat back relative to the seat base. Such manual recliner mechanisms often include a lever handle located on a side of the vehicle seat for actuation of the recline feature by the occupant. When the occupant desires to change the position of the seat back, he or she actuates the lever, unlocking the seat back typically against the force of a spring biasing the seat back in a given direction, most commonly in the forward direction. With the recliner mechanism released, the occupant is free to alter the position of the seat back relative to the seat base. The position of the seat back is locked into position when the lever is released or located back in its original or locked position.

Because such seat recliner mechanisms are common in the highly competitive automobile industry, it is increasingly important to produce as inexpensive a recliner mechanism as possible while maintaining a robust recliner mechanism. It is necessary to insure that the recliner mechanism is sufficiently robust so the seat back does not alter its position on an unwanted occasion, exhibits proper characteristics in high load conditions and has an appropriate useful life. Furthermore, due to the limited space inside the passenger compartment of automobiles, it is increasingly important to provide a recliner mechanism that accomplishes the above while using a minimum amount of space and at a lower cost.

In many conventional recliner mechanisms one of the above objectives must often be compromised to satisfy the other objectives. For example, a number of highly robust recliner mechanisms will include several components that are made from costly high strength materials. Other mechanisms use highly complex arrangements of components resulting in greater size, complexity and cost. An increased number of parts or the use of high-strength materials, however, also often result in a higher cost to manufacture and assemble. If lower cost, less durable components are used, however, the overall strength of the recliner mechanism will be negatively affected, resulting in lower customer satisfaction and quality.

It is known to use a round sector mechanism in a recliner mechanism for use in a vehicle seat. For example, see U.S. Pat. No. 5,935,698 which discloses the use of a round sector gear in a recliner mechanism. Further, it is known to use pawl members in combination with a curved sector gear. It is also known that round recliners can be used to adjust the seat back with respect to the seat base and lock the seat back in place. Numerous examples of such round recliner mechanisms exist in the prior art. For example, see U.S. Pat. No. 4,995,669, to Croft; U.S. Pat. No. 5,590,931, to Fourrey et al.; U.S. Pat. No. 5,558,402 to Yamada; U.S. Pat. No. 4,408,799, to Bowman; U.S. Pat. No. 5,685,440 to Minai; U.S. Pat. No. 5,524,970, to Kienke et al.; U.S. Pat. No. 6,149,235, to Fahim; U.S. Pat. No. 6,120,098, to Magyar et al.; and U.S. Pat. No. 6,305,748 to Ohba. However, while the above prior art patents disclose numerous mechanisms for moving the pawl members into and out of engagement with the sector member, none do so in a highly simple and efficient manner while providing a sufficiently strong recliner mechanism that will perform adequately in the varied conditions of an automotive seat.

In particular, the prior art discloses and teaches that the round sector member having ring gear teeth located on an inner side of the ring gear and pawls are co-located inside of the ring sector gear and aligned to engage the teeth of the ring gear. Additionally, several of the above patents disclose the use of a plurality of translating or pivoting pawl members operated using a cam mechanism to activate and move the pawls out of engagement with a sector member. Due to the compact size limitations for vehicle seat recliner mechanisms and the high loads incurred, it is known to use multiple pawl members, even four or six pawl members, to distribute the loads around the sector gear. However, with the increased number of pawl members, the complexity associated with operating the pawl members and maintaining proper operating conditions of the recliner mechanism increases as well as the total weight of the recliner mechanism. Further, while it is known to move the pawl members with respect to the round sector gear using various known mechanisms such as cams to translate, rotate or otherwise move the pawl member with respect to the round sector gear, such mechanisms have proven inadequate since there remains an insufficient amount of contact between the pawl member and the round sector gear to carry and distribute the substantial loads in the recliner mechanism.

Accordingly, there remains a significant need to develop a round sector gear recliner mechanism capable of carrying the loads necessary to function as a recliner mechanism in a vehicle seat that can be packaged within the space requirements at a sufficiently low cost and overcomes the drawbacks of the prior art.

SUMMARY OF THE INVENTION

It is an object of the present invention to provide an improved, robust high strength design for a seat recliner mechanism.

It is another object of the present invention to provide an improved vehicle recliner mechanism having a compact design.

It is yet another object of present the invention to provide an improved recliner mechanism for use in a vehicle seat.

It is still another object of the present invention to provide an improved automobile seat recliner that is less complex in design than known conventional seat recliners.

It is another object of the present invention to provide an improved automobile seat recliner that can achieve all of the above objects in a single recliner mechanism.

One embodiment of the present invention relates to a recliner mechanism and seat assembly that results in a robust system that fits in a compact space while having a lower cost to manufacture and assemble. The recliner mechanism of the present invention includes fewer moving parts thereby reducing the system's overall complexity.

One embodiment of the present invention relates to a seat recliner mechanism and system including a notched edge, sector member in the form of a round sector member having a plurality of teeth located on an edge of the round sector gear member and being substantially surrounded by first and second pawl members each having a mating notched edge, preferably in the form of mating teeth. In one embodiment of the present invention, the round sector member is fixedly secured to one of a seat base frame assembly or a seat back frame assembly and the first and second pawl members are coupled to the other of the seat base frame assembly and the seat back frame assembly to adjust the seat back frame assembly with respect to the seat base. The notched edges of the first and second pawl members preferably each include a plurality of teeth such that the pawl members are capable of engaging, meshing and disengaging with the notched edge or mating teeth of the round sector member.

In one embodiment of the present invention, each pawl member has a first or proximal end and a second or distal end. The first ends of the first and second pawl members are aligned to rotate on a common axis defined by a pivot pin and the second ends of the first and second pawl members are each located distal from the first ends and surrounding the sector member. Preferably, the common axis of the first ends of the first and second pawl members is defined by a bolt which connects the first and second pawl members together and passes through holes in the first ends of the first and second pawl members. In one embodiment of the present invention, a means for moving the second ends of the first and second pawl members in to and out of engagement with the sector member as they rotate about the common axis of the first ends of the first and second pawl members is provided. The means for moving may be manually or electrically operated. In one embodiment of the present invention, the means for moving the first and second pawl members in to and out of engagement with the sector member includes a pair of cam pin members each having a first axis of rotation and a second axis of rotation offset from the first axis of rotation, the second axis of rotation is defined by a cam lobe having a different profile than and located between a pair of ends. Each cam pin member has its ends journaled in the seat back frame member and its cam lobe is passes through a hole in each second end of the first and second pawl members. Each cam pin member is preferably journaled or connected to the seat back frame for rotation about its first axis of rotation and the second axis of rotation of the cam pin member rotates with the second end of the pawl member about the common axis of the first ends of the first and second pawl members.

Each cam pin member is also provided with a toothed gear lobe located between the cam lobe and one of the ends of the cam pin. Each toothed gear lobe of each cam pin member is designed to engage the other such that rotation of one cam pin member in one direction of rotation causes the other cam pin member to rotate in the opposite direction.

According to one embodiment, one of the cam pins has a lever member to be used has a handle by a user to operate the recliner mechanism. The lever member is biased into a first or locked position in which first and second pawl members engage the sector member and the seat back can not be rotated with respect to the seat base. A coil spring is used to bias the lever member such that the recliner mechanism in the locked position. A user may exert a sufficient force on the lever member to overcome the force of the coil spring and cause the cam pins to rotate, thereby causing the first and second pawl members to rotate out of engagement from the sector member to an unlocked or operating position. Thus, rotation of the lever member results in a rotation of the pawl members about the common pivot connection at the opposite ends of the pawl members, causing the pawl members to move away and disengage from the notched edge of the round sector member in a "scissors-type" action. When the recliner mechanism is in the unlocked position—the notched edges of the pawl members are disengaged from the notched edge of the round sector member—the seat back may rotate relative to the seat base.

The plurality of teeth of each pawl member vary over the length of the pawl member. A first portion of the plurality of the teeth of the pawl member have a relatively low profile, a second portion of the plurality of the teeth of the pawl member have a relatively normal profile and a third portion of the plurality of the teeth of the pawl member have a relatively angled profile.

Further advantages and features of the present invention will become apparent to a person of ordinary skill in the art from the following specification and claims illustrating at least a preferred embodiment of the present invention.

BRIEF DESCRIPTION OF THE DRAWINGS

FIG. 9 is a sectional view of the recliner mechanism according to the present invention taken along line 9-9 in FIG. 2; and FIG. 10 is a sectional view of the recliner mechanism according to the present invention taken along line 10-10 in FIG. 3.

DETAILED DESCRIPTION OF THE INVENTION

Figure 1:
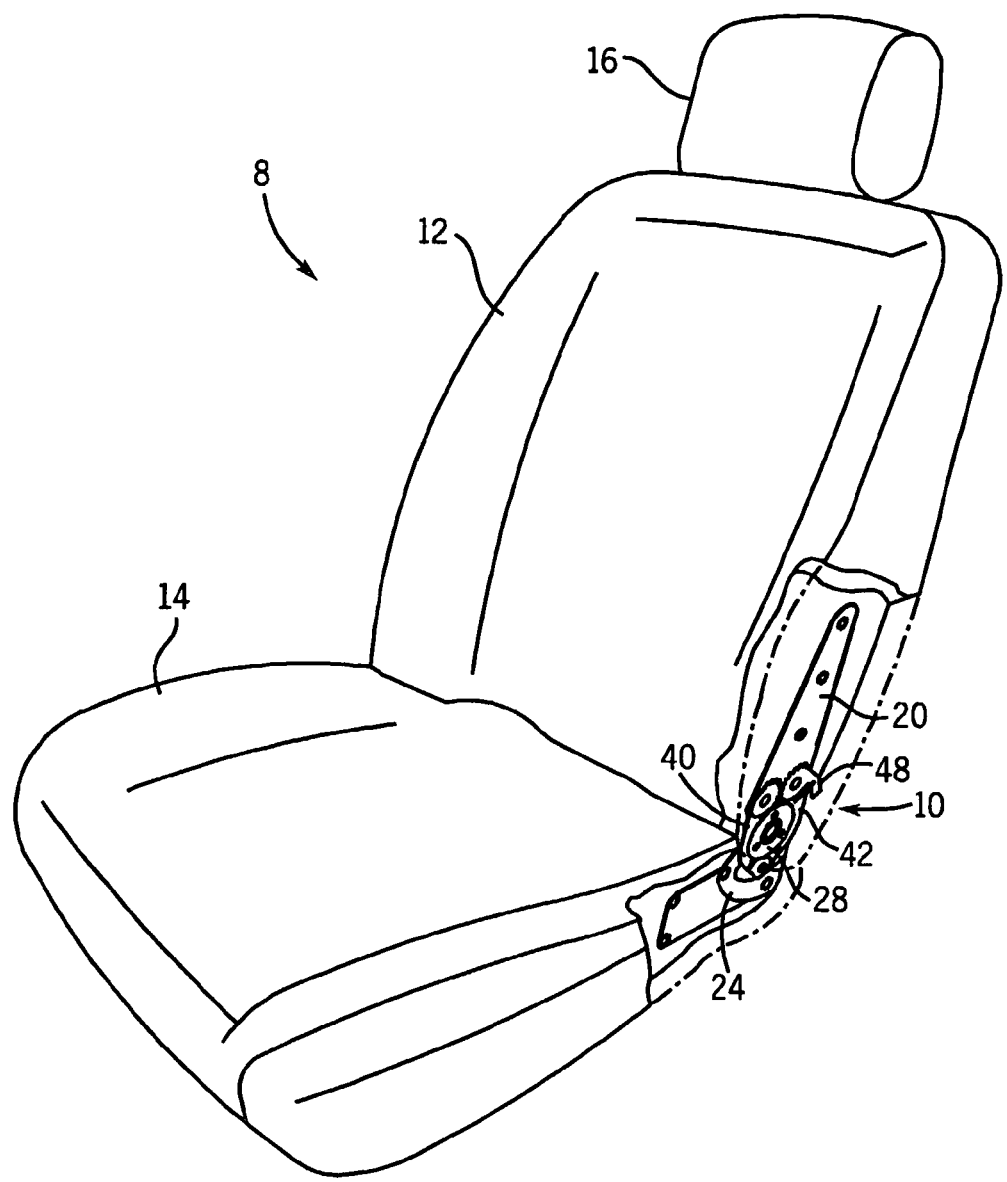
FIG. 1 is a perspective view of a seat including a recliner mechanism embodiment according to the present invention.

Referring generally to FIGS. 1-6 and in particular to FIGS. 1-4, there is shown a vehicle seat 8 having a section cut away in FIG. 1 to show a recliner mechanism 10. The seat 8 includes a seat back 12 and a seat base 14 of any appropriate or conventional design and general construction. The seat back 12 includes a first seat back frame or member 20 and a second seat back frame or member 22 (see FIG. 5). The first and second seat back members 20 and 22, respectively, are formed to create a space 21 there between to receive at least a portion of the recliner mechanism 10. The first and second seat back members 20 and 22, respectively, are connected using any known or appropriate coupling device such as a bolt 23. The first and second seat back members 20 and 22, respectively, are made from any known or appropriate material as is known in the industry of designing recliner mechanisms and preferably from a metal such as steel or a steel alloy. The seat back has other standard or known features such as headrest 16.

The seat base 14 is coupled or connected to a first seat base frame or member 24 and a second seat base frame or member 26 (see FIG. 5) using any known or appropriate coupling device such as bolt 27. The first and second seat base members 24 and 26, respectively, are formed to create a space 25 there between to receive at least a portion of the recliner mechanism 10. The first and second seat base members 24 and 26, respectively, are preferably made from the same material as the first and second seat back members 20 and 22, respectively. It is possible, however, that any other known or appropriate metal, alloy or other material may be used without departing from the invention's broader aspects. In an alternative embodiment, the first and second frame members of the seat back 12 and seat base 14 may be welded together. In a further alternative, the first and second frame members of the seat back 12 and seat base 14 may be made as a single piece with the recliner mechanism 10 such that the first and second frame members of the seat back 12 and the seat base 14 are not coupled or bolted to the recliner mechanism 10 using the bolts 23 and 27, respectively.

The recliner mechanism 10 of the present invention preferably includes a sector gear member 28 having a round shape and having at least one set of teeth 30. In one preferred embodiment the sector member 28 is fixedly secured to the first seat base frame 24 and second seat base frame 26 using three pins 37. Each pin 37 has ends fixedly secured to the first and second seat base frame members 24 and 26 using any known or appropriate means for securing the pin 37 such as by staking. Each pin 37 passes through a hole in the sector member 28 to couple the sector member 28 to the first seat base frame 24 and the second seat base frame 26. Other coupling or fastening means such as screws, bolts or the like may alternatively be used as long as the sector member 28 is securely fixed to the first seat base frame 24 and the second seat base frame 26, without departing from the present invention's broader aspects.

Figure 6:
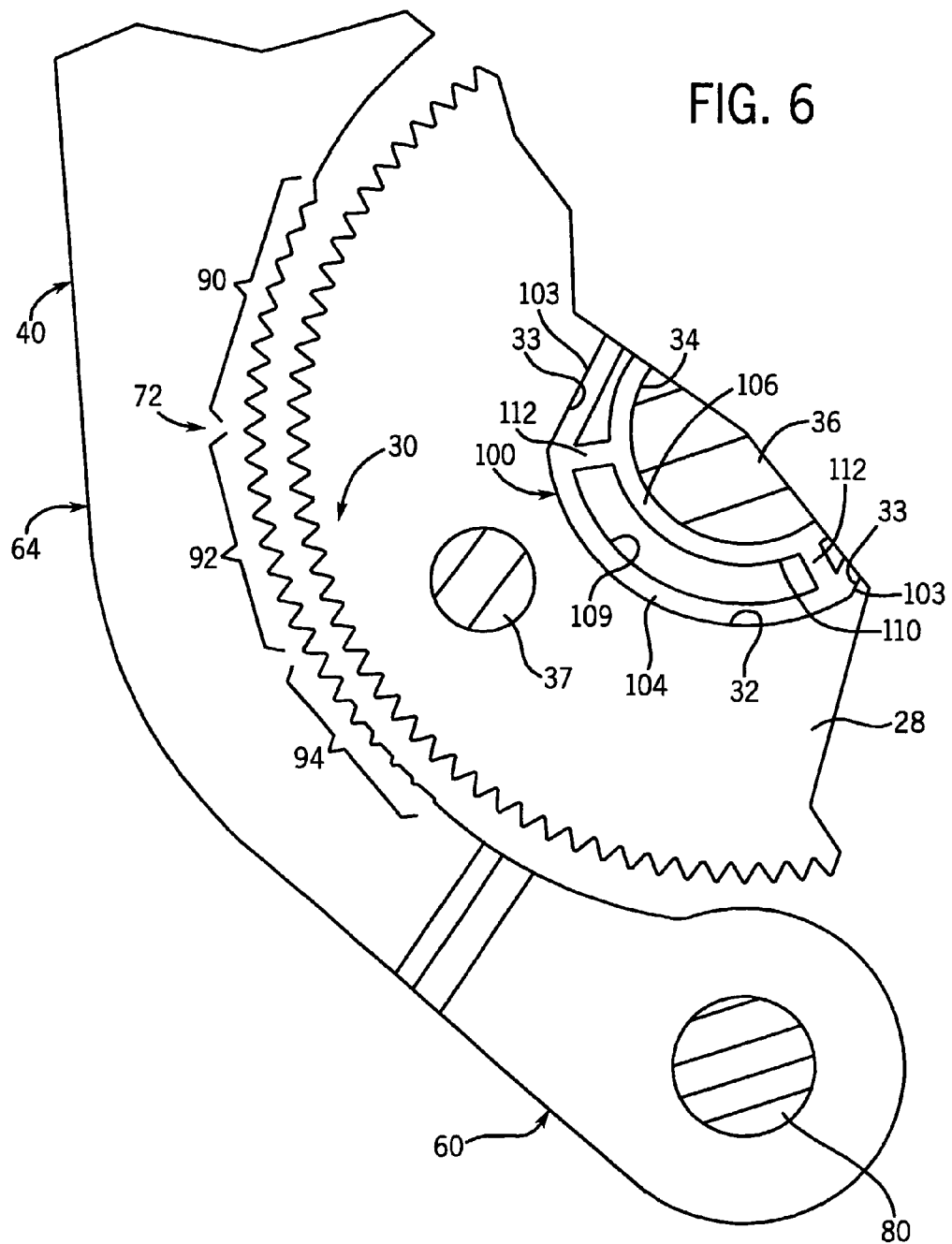
FIG. 6 is a magnified view of the interaction of the first pawl member and the notched round sector member of a recliner mechanism embodiment according to the present invention.

The sector member 28 is preferably disc-shaped and includes a peripheral edge having a plurality of sector member teeth 30 as shown in detail in FIG. 6. The sector member teeth 30 serve as notches for engaging corresponding mating portions of the pawls as further described below. The sector member 28 further includes a passage 32 located in the center of the sector member 28. The passage 32 has a generally round or circular shape and has a pair of flat sections 33.

The recliner mechanism according to the present invention further preferably includes a bushing 100 made from a polymeric material such as nylon or similar material and is preferably fixedly secured in the passage 32 of the sector member 28. It is possible, however, that any other known or appropriate material may be used without departing from the invention's broader aspects. The bushing 100 has an outer portion 104 having a shape corresponding to the passage 32 of the sector member 28. Similar to the passage 32, the outer portion 104 of the bushing 100 preferably has a pair of flats 103 to prevent the bushing 100 from rotating within the passage 32 and an inner periphery 109. The bushing 100 further includes an inner portion 106 having a generally cylindrical shape. The inner portion has a passage 108 therein and an outer periphery 110. A plurality of legs or extension members 112 extend between the outer periphery 109 of the inner portion 106 and the inner periphery 110 of the outer portion 104 and define a plurality of spaces 113 within the bushing 100. Accordingly, the design and material properties of the bushing 100 function to provide some resiliency in the recliner mechanism 10.

The recliner mechanism 10 further includes a first pawl assembly or member 40 and a second pawl assembly or member 42. The first and second pawl members 40 and 42, respectively, are preferably made from a high strength metal, such as steel, or metal alloy but may alternatively be made from any known or appropriate material as is known in the industry of designing recliner mechanisms without departing from the broader aspects of the present invention. The first pawl member 40, the second pawl member 42 and the sector member 28 are preferably aligned substantially coplanar although it is possible to construct the components to be offset and yet still provide the interaction and function required to operate the recliner mechanism 10 according to the present invention. The first pawl member 40 includes a first end 60, an intermediate portion or region 64 and a second end 68. Similarly, the second pawl member 42 includes a first end 62, an intermediate portion or region 66 and a second end 70. The recliner mechanism 10 of the present invention further includes a bolt or pin 80 passing through holes 61 and 63 in the first ends 60 and 62 of the first and second pawl members 40 and 42, respectively. Accordingly, the second ends 68 and 70 of the first and second pawl members 40 and 42, respectively, are constrained to pivot on an axis defined by the bolt 80. While the pin 80 is disclosed as being a bolt or similar device, any other known or appropriate coupling device, such a screw, pin, rod other or known rotatable fastener is possible.

The intermediate region 64 of the first pawl member 40 preferably includes a first notched or teeth portion 72 for engaging the sector member teeth 30 of the sector gear member 28. Similarly, the intermediate region 66 of the second pawl member 42 also preferably includes its own first notched or teeth portion 74 for interaction with the sector member teeth 30 of the sector member 28.

The recliner mechanism 10 according to the present invention further includes a first operating member or first cam pin 44 located in a passage or hole 45 in the second end 68 of the first pawl member 40 and a second operating member or second cam pin 52 located in a passage or hole 49 in the second end 70 of the second pawl member 42. The first cam pin 44 is generally round, similar to a cam shaft, and has a first end 46 having a generally circular cross section and a second end 50 having a generally circular cross section. Both the first end 46 and the second end 50 of the first cam pin 44 have an aligned center axis such that the first end 46 and second end 50 both rotate on the same center axis A, see FIGS. 7-10. The first cam pin 44 further includes a first cam lobe 47 having a generally circular cross section defining a cam lobe center axis B spaced from or offset from the center axis A. The center axis B of cam lobe 47 coincides with the center of the hole 45.

The second cam pin 52 is generally round, shaped similar to a cam shaft, and has a first end 53 having a generally circular cross section and a second end 55 having a generally circular cross section. Both the first end 53 and the second end 55 of the second cam pin 52 have an aligned center axis such that the first end 53 and second end 55 both rotate on the same center axis C. The second cam pin 52 further includes a second cam lobe 57 having a generally circular cross section defining a second cam lobe center axis D spaced from or offset from the center axis C. The center axis D of the second cam lobe 57 corresponds with the center of the hole 49.

While the first and second cam pins 44 and 52, respectively, are shown as being advantageously a single, unitary piece, it is possible to manufacture the cam pins 44 and 52 as multiple pieces integrated into a unit without departing from the broader aspects of the present invention. Further, it should be understood that it is possible to rearrange the design of the cam pins 44 and 52 to vary from the embodiment shown without departing form the broader aspects of the present invention.

Figure 2:
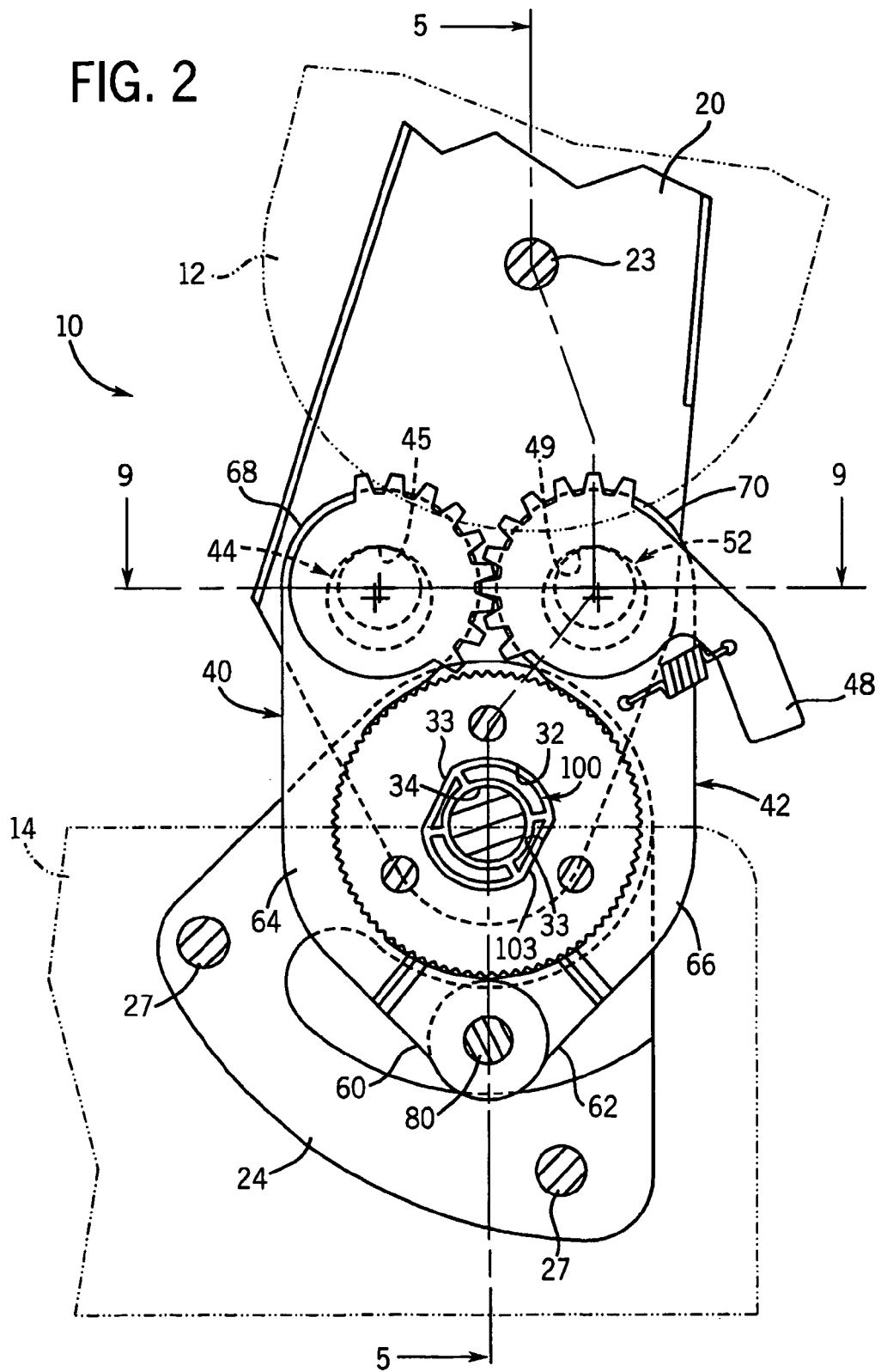
FIG. 2 is a partial side view of a recliner mechanism embodiment according to the present invention with the first and second pawl members in a locked position and a seat back is in a first or upright position.

In one preferred embodiment, the recliner mechanism 10 further includes a lever arm member 48 connected to or made integral with one of the first and second cam pins 44 and 52, respectively. As shown in the figures, the lever 48 is connected with the second cam pin 52 and serves as a handle for activating the seat recliner mechanism 10. A biasing member 120 couples the lever 48 preferably to the second pawl member 42, but may alternatively be connected with any other appropriate structure. In one embodiment of the invention as shown in FIG. 2, the biasing member 120 is a standard extension, coil spring.

It is possible, however, that other types of biasing members, including various types of springs or rubber pack systems, may be used for biasing the lever arm member 48 and the second cam pin 52 without departing from the broader aspects of the present invention. The biasing member 120 biases the lever arm member 48 toward a first, locked position as shown in FIG. 2 wherein the first pawl member 40 and the second pawl member 42 fully engage the sector member 28.

In one embodiment according to the present invention, the first cam pin 44 of the first pawl member 40 includes a second notched or gear portion 76. Similarly, the second cam pin 52 of the second pawl member 42 includes a second notched or gear portion 78. Each second gear portion 76 and 78 preferably have a substantially circular cross section having a center axis coinciding with the center axes A and C, respectively, of the first and second cam pins 44 and 52. Each of the second gear portions 76 and 78 are preferably located on the first and second cam pins 44 and 52, respectively, between the cam lobes 47 and 57 and the ends 50 and 55. Preferably, the second gear portion 76 of the first cam pin 44 and the second gear portion 78 of the second cam pin 52 are aligned and in mating engagement. However, it should be understood that the second gear portions 76 and 78 may be translated to any position connected with the first and second cam pins 44 and 52. Additional linkage, gears or link members may be included for connection with the cam pins 44 and 52.

Rotation of the handle 48 causes the second cam pin 52 and its second gear portion 78 to rotate about the center axis C, and since the second gear portion 76 of the first cam pin 44 is in meshing engagement with the second gear portion 78 of the second cam pin 52, the first cam pin 44 rotates about the center axis A. As best shown by the arrows in FIG. 3, as a result of the mating engagement of the second gear portion 76 and the second gear portion 78 and the connection of the first and second operating members 44 and 52 at their respective first ends 60 and 62, the second end 68 of the first pawl member 40 rotates in a substantially opposite direction as the second end 70 of the second pawl member 42 when the lever arm member 48 is rotated. In one particular embodiment of the invention, the second gear portions 76 and 78 comprise gear teeth 82 and 84, respectively, covering approximately 180° of their respective circumference corresponding to the interface area between the second gear portions 76 and 78. It is not necessary for the second gear portions 76 or 78 to extend further because the first and second pawl members 40 and 42, respectively, must only rotate on bolt 80 enough to disengage the respective teeth portions from the sector gear member 28.

The recliner mechanism 10 of the present invention preferably includes a means for moving the first and second pawl members 40 and 42, respectively into and out of engagement with the sector gear member 28. The means for moving the first and second pawl members 40 and 42, includes, at a minimum, the first and second cam pins 44 and 52. Additionally, the means for moving the first and second pawl members 40 and 42, includes the first and second cam pins 44 and 52 respectively, their respective gear portions 76 and 78 and the offset centers B and D of the cam lobes 47 and 57. Notwithstanding the above, it should be understood by a person of ordinary skill in the art that the above means for moving is simply that corresponding structure shown in the preferred embodiment of the present invention and that other structure appropriate for moving the first and second pawl members 40 and 42, respectively, in to and out of engagement with the sector gear member 28 may be utilized.

Figure 5:
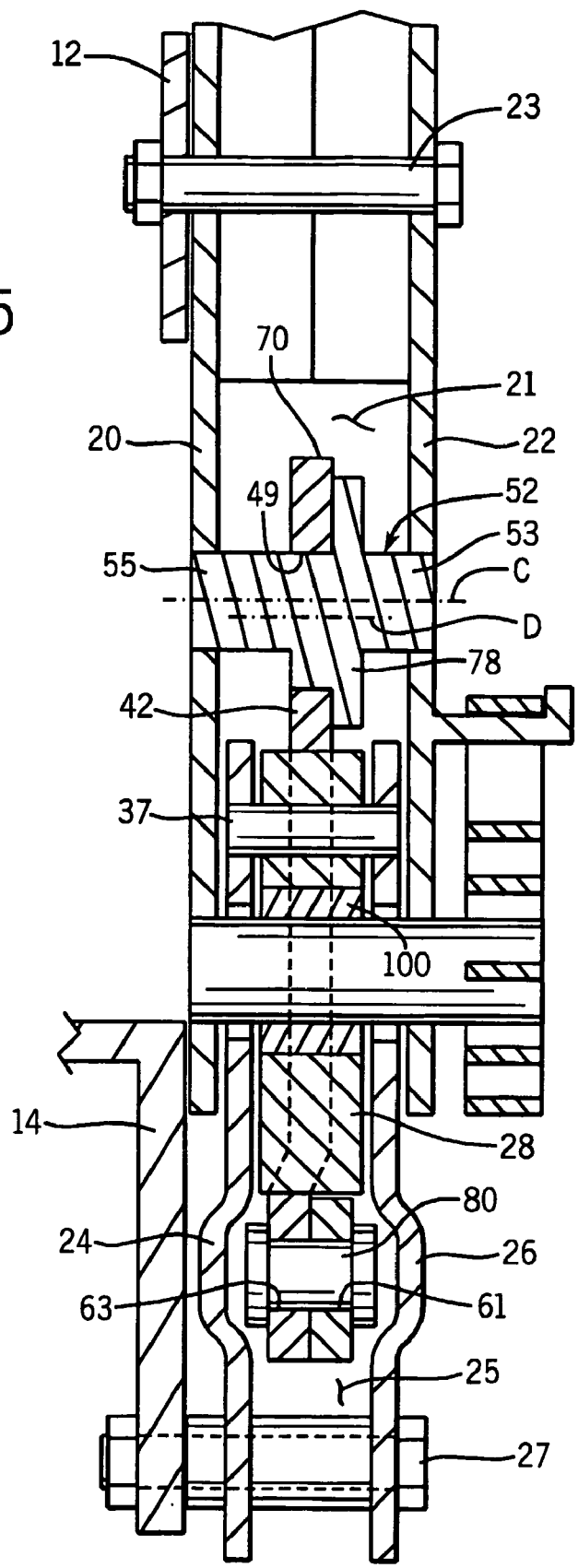
FIG. 5 is a sectional view of a recliner mechanism embodiment according to the present invention taken along line 5-5 of FIG. 2.

As shown best in FIG. 5, the first seat back frame 20 and the second seat back frame 22 are preferably located generally outside the first seat base member 24 and the second seat base member 26. The first seat back frame 20 and the second seat back frame 22 are preferably coupled by a pin 36 preferably having a solid, circular cross section. The pin 36 anchors to both the first and second seat back frames 20 and 22 respectively, while passing through the passage 108 in bushing 100 located in the passage 32 of the sector member 28. The pin 36 is preferably rotatable separately from the bushing 100 and the sector member 28 and rotates with the seat back 12 since it is fixed with the seat frames 20 and 22. Accordingly, the bushing 100 functions to allow the pin 36 to rotate within the passage 108 of the bushing 100 and provides some give in the recliner mechanism 10 due to the nature of the material constituting the bushing 100.

As best shown in FIG. 6, the sector member teeth 30 of the sector member 28 do not have a constant size and shape according to one preferred embodiment of the present invention. In order to maximize and operate the engagement between the sector member teeth 30 and the first teeth portions 72 and 74 of the first and second pawl members 40 and 42, respectively, the first notched portions 72 and 74 include angled teeth portion 90, standard mating teeth portion 92 and low profile teeth portion 94. The angled teeth 90 are located at a first portion or region 96 of the first notched portions 72 and 74. The low profile teeth 94 are located at a second region 98 of the first notched portions 72 and 74, and the standard mating teeth 92 are preferably located between the low profile teeth 94 and the angled teeth 90. The angled teeth 90, the standard mating teeth 92 and the low profile teeth 94 correspond to the shape and size of the first notched portions 72 and 74 of the first pawl member 40 and the second pawl member 42. Although the shape and size of the angled teeth 90, the standard mating teeth 92 and the low profile teeth 94 vary, their size and shape are preferably chosen to maximize the engagement with the mating sector member teeth on the sector member 28 and still provide an operational recliner mechanism 10.

The angled teeth 90 allow the first and second pawl members 40 and 42, respectively, as the first and second pawl members 40 and 42 rotate about bolt or pin 80, to be withdrawn from the sector member 28 when the mechanism 10 is activated. Traditionally, pawl members interacting with a round sector member have been of a limited arc length due to the inability to translate or move the pawl member with respect to a sector member due to the mating teeth binding, sticking or interfering with the angle of entry. In one embodiment of the present invention, the angled teeth 90 allow the first and second pawl members 40 and 42, respectively, to be rotated on the pin 80 and allow for the angled teeth 90 to withdraw from and engage the sector member teeth 30 without binding or sticking.

The standard mating teeth 92 provide significant load carrying capability when mating with the sector member teeth 30 of the sector member 28 and the low profile teeth 94 allow the first and second pawl members 40 and 42, respectively, to disengage from the sector member 28 when the recliner mechanism 10 is operated to allow the movement of the seat back 12 with respect to the seat cushion 14. The low profile teeth 94 provide sufficient clearance between the first and second pawl members 40 and 42, respectively, and the sector gear member 28 due to the scissors-type action of the first and second pawl members 40 and 42, respectively, operating about bolt 80. Since the first pawl member 40 rotates on bolt 80 the clearance between the first pawl member 40 near the first end 60 and sector gear member 28 is less than the clearance between intermediate region 64 and sector gear member 28 which is less than the clearance between second end 68 and sector gear member 28 for a given position of the first pawl member 40 due to the effect of angular displacement with distance. The same will necessarily be true for the clearance between second pawl member 42 and the sector gear member 28 as well.

The first pawl member 40 and the second pawl member 42 combine to substantially surround the sector gear member 28. In one embodiment of the invention, the thickness of the first and second pawl members 40 and 42 is each reduced near the location of the bolt 80 relative to the thickness of the second end 68 of the first pawl member 40 and the second 70 of the second pawl member 42. Reducing the thickness at the first ends 60 and 62 of the first and second pawl members 40 and 42, respectively, allows the first and second pawl members 40 and 42 to overlap and both connect to the bolt 80 without increasing the overall thickness or width, resulting in an overall saving of space in the seat recliner mechanism 10. Alternatively, the first and second pawl members 40 and 42 may have a constant thickness at their first ends 60 and 62, respectively, and can be offset or stepped to accommodate the constant thickness.

As shown in FIG. 5, a number of component clearances are required. In a preferred embodiment of the invention, an assembly clearance of approximately 0.05 mm is included between the pin 36 and the passage 108 in the center piece bushing 100. Furthermore, a larger clearance of approximately 5 mm is included between the pin 36 and the passages in first and second seat base arms 24 and 26. The larger clearance and the material properties of the bushing 100 function to define an amount of force that may be put into the recliner mechanism 10 before the pin 36 moves a sufficient distance to deflect and collapse the center piece bushing 100 and contact the passage 32 in the sector member 28. While robust in design, the bushing 100 will deflect and collapse upon a predetermined high degree of force, such as a force that would occur during an impact in an unintended incident.

Under normal operation, once the recliner mechanism 10 is unlocked or released, the seat back 12 may rotate about the pivot bushing 100. When the recliner mechanism 10 is in the locked position, displacement within the recliner mechanism 10 will occur about the component with the most compliance—in this instance, the bushing 100. In the recliner mechanism 100, loads applied to the seat back 12 are transferred through the first and second seat frames 20 and 22 into three points defined by the first and second cam pins 44 and 52 and the pin 36. The bushing 100 provides the pin 36 with a degree of freedom thereby creating an artificial pivot between the cam pins 44 and 52 resulting in rotation of the cam pins 44 and 52 with respect to the pin 36. This rotation makes the first and second pawl members 40 and 42 tighten on the sector member 28 and create a clamping force. The net result of the first and second pawl members 40 and 42 clamping force on the sector member 28 is that the recliner mechanism 10 of the present invention can tolerate greater loads applied to the seat back 12 beyond the normal tolerable loads which would exceed the shear forces of a pawl and sector recliner mechanism without the bushing 100.

Figure 7:
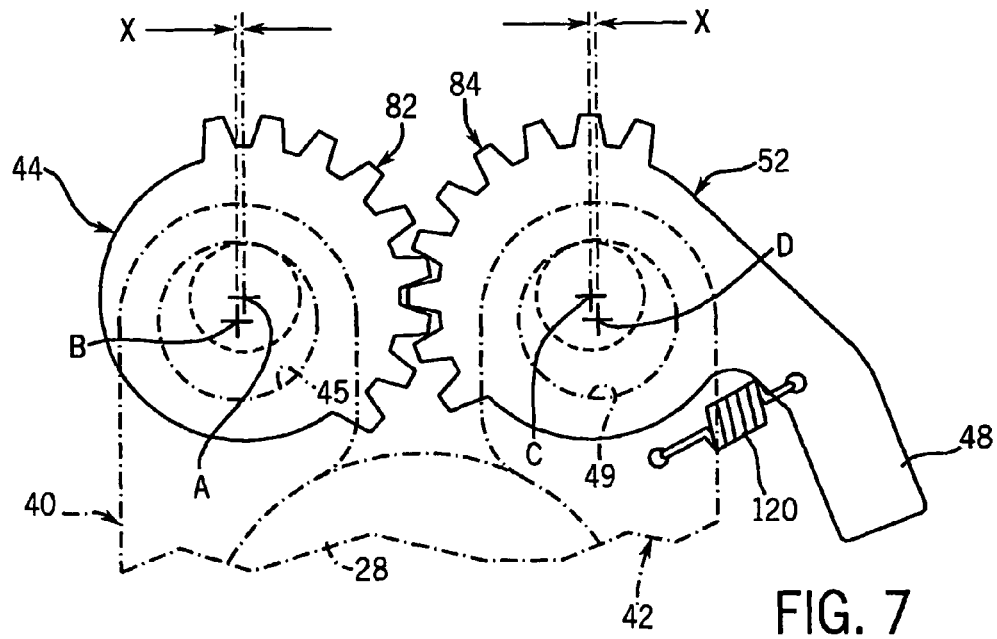
FIG. 7 is a partial side view of a seat recliner mechanism embodiment according to the present invention showing detail of the cam pin members and the first and second pawl members located in the locked position.
Figure 8:
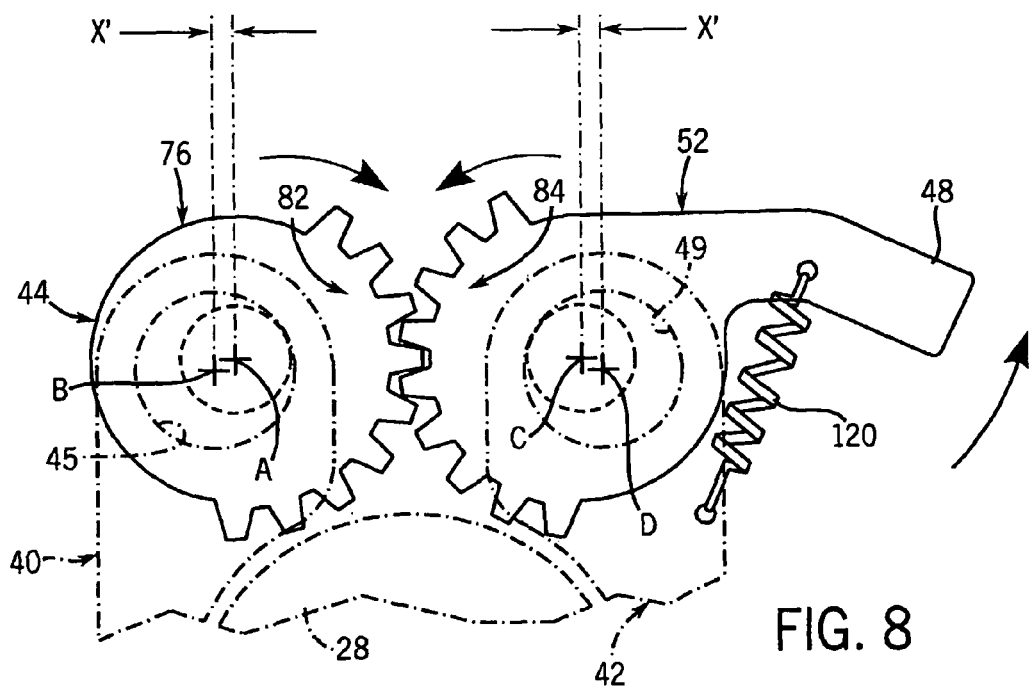
FIG. 8 is a partial side view of a seat recliner mechanism embodiment according to the present invention showing detail of the cam pin members and the first and second pawl members located in the unlocked position.

With particular reference to FIGS. 7-10, when handle 48 is activated to disengage the first pawl member 40 and the second pawl member 42 from the sector gear member 28, the eccentric or off-set centers B and D of the first and second cam lobes 47 and 57 rotate about centers A and C of the first and second cam pins 44 and 52, respectively. The eccentric centers B and D are offset slightly from the centers A and C on which the first and second cam pins 44 and 52. As noted above, the eccentric centers B and D also rotate about the pin 80 when a user moves the handle 48 from a locked position, as shown in FIGS. 7 and 9, to an unlocked position, as shown in FIGS. 8 and 10, causing each of the first and second pawl members 40 and 42, respectively, to move from X to X', since the second notched portions 76 and 78 have a constant radius about the centers A and C. As can be appreciated the radii center axes A, B, C, and D are chosen such that the recliner mechanism 10 only need a minimum of movement between the locked and unlocked positions while maintaining sufficient contact and force carrying ability while in the locked position.

The operation of the seat recliner mechanism 10 is generally as follows. When the lever arm or handle 48 is in the first, locked position shown in FIG. 2, the first pawl member 40 and the second pawl member 42 are in substantially full engagement with the sector teeth 39 of the sector 28. The first seat back arm 20 and the second seat back arm 22 are locked in place and their rotation is impeded so long as the intermediate regions 64 and 66 of the first and second pawl members 40 and 42 are in engagement with the sector teeth 30 of the sector 28. As a result, rotation of the seat back 12 is impeded relative to the seat base 14.

Figure 3:
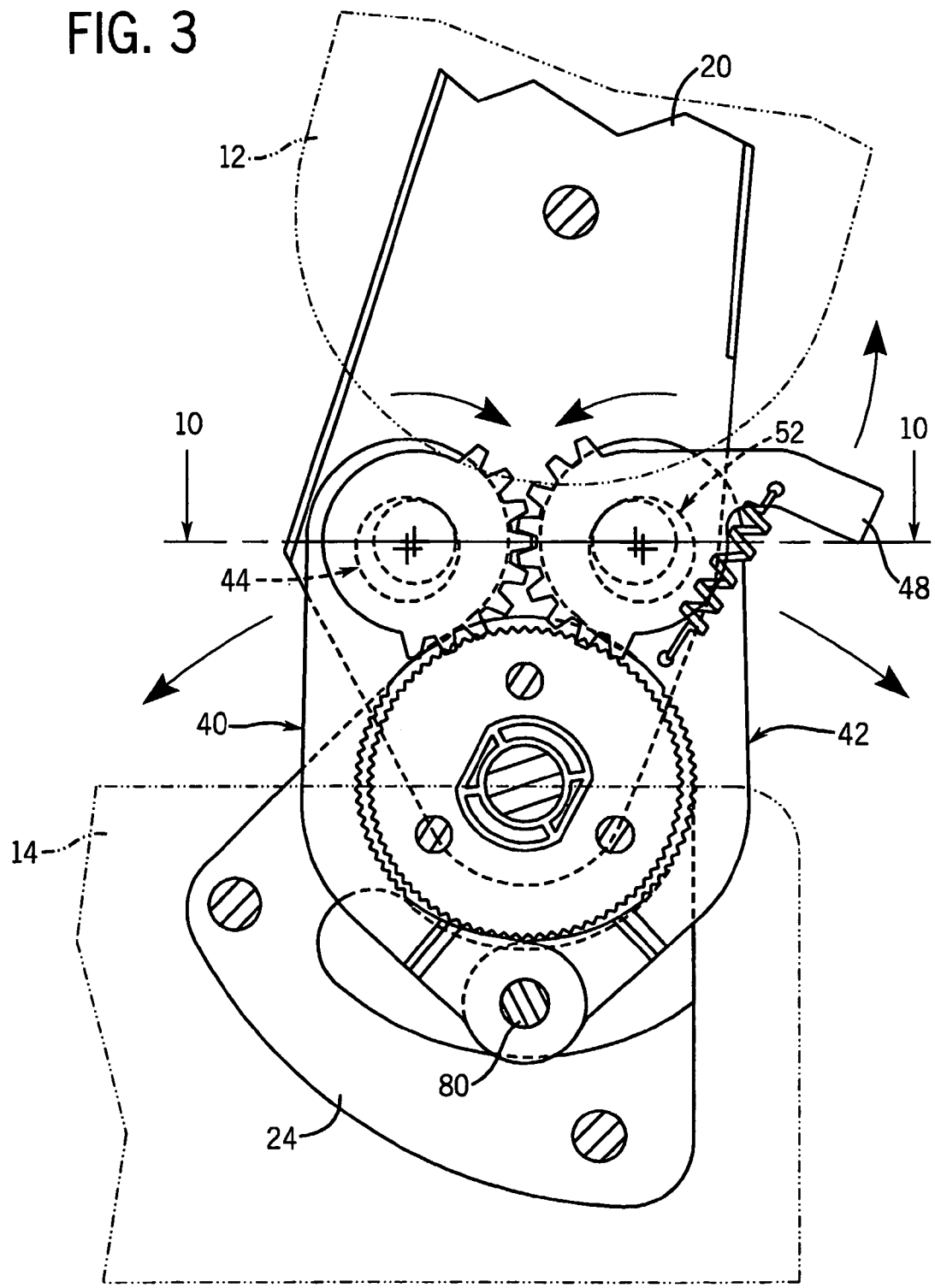
FIG. 3 is a partial side view of a recliner mechanism embodiment according to the present invention with the first and second pawl members located in an unlocked position.

To alter the position of the seatback 12 relative to the seat base 14, the user exerts enough force against the handle 48 to overcome the force of the biasing member 120, moving the handle 48 from the locked position to the unlocked position, see FIG. 3. The movement of the handle 48, and the second cam pin 52, causes the second notched portion 78 to rotate on the center axis C causing the second pawl member 42 to rotate about the pin 80. Since the second notched portion 76 of the first pin member 44 is in engagement with the second notched portion 78, the rotation of the handle 48 causes the first pin member 44, to rotate about the center A and the first pawl member 40 to rotate in substantially an opposite direction as the second pawl member 42 about pin 80. The rotation of the first and second pawl members 40 and 42, respectively, is sufficient to disengage the teeth 38 of the intermediate regions 64 and 66 from the sector member teeth 30 of the center sector member 28. Once the intermediate regions 64 and 66 are disengaged from the sector member teeth 30, the first seat back frame 20 and the second seat back frame 22 may be freely rotated relative to the sector gear member 28, and the first and second seat base frames 24 and 26.

The user may rotate the seat back 12 relative to the seat base 14 against the bias force of a coil spring 152 as seen in FIG. 5. The spring 152 biases the seat back 12 with respect to the seat base 14 such that when the recliner mechanism 10 is unlocked, the seat back 12 is forced toward the seat base 14 as is commonly done in vehicle seats. The coil spring 152 has a first end 153 anchored to the seat back 12 at a connection member 151. The coil spring 152 has a second end 155 anchored to a slot or similar passage 156 in the pin 36 which connects the second end 155 of the spring 152 to the seat base 14.

Figure 4:
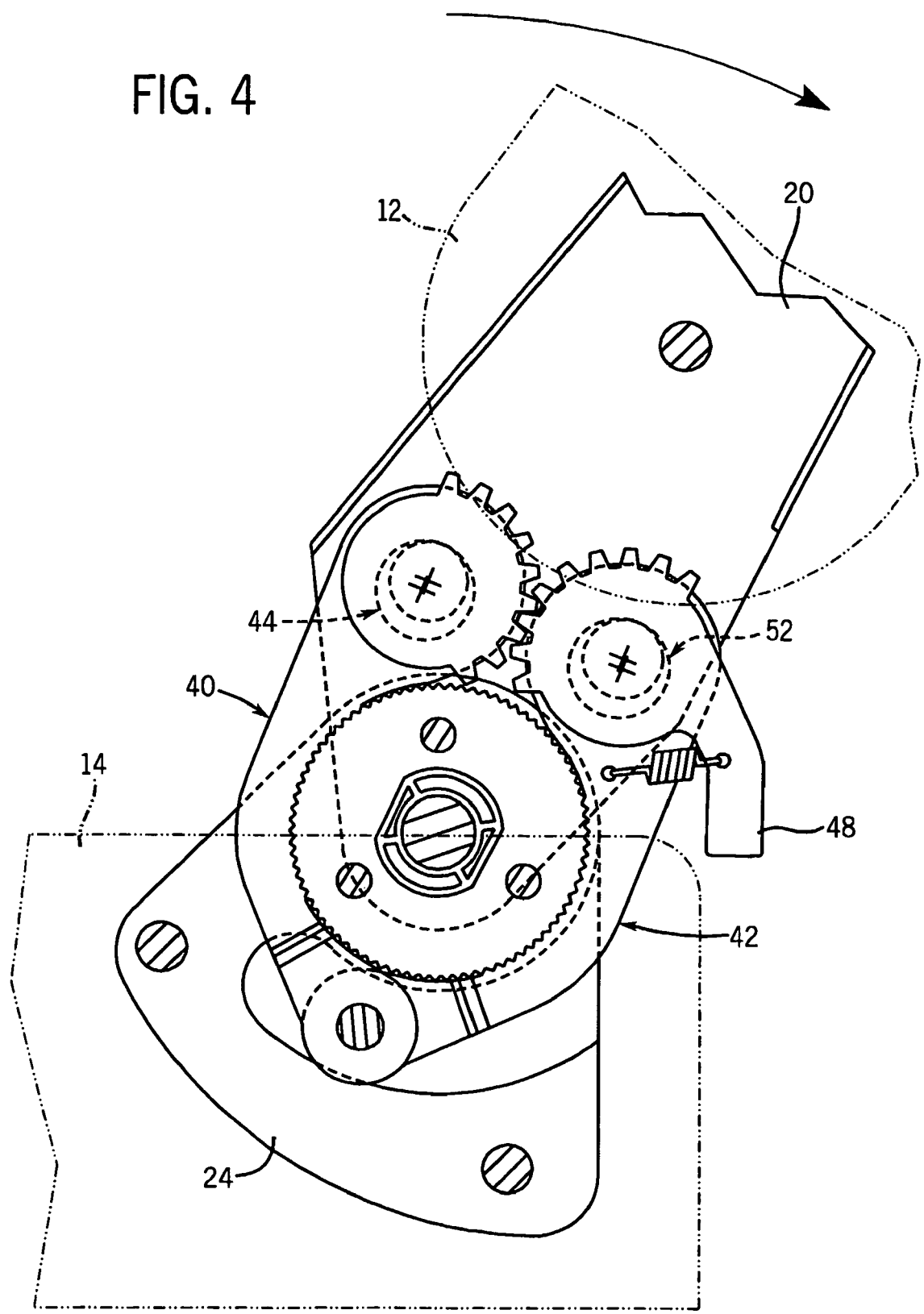
FIG. 4 is a partial side view of a recliner mechanism embodiment according to the present invention with the first and second pawl members located in a locked position and the seat back is in a second or reclined position.

Once the user has positioned the seat back 12 in a desired position relative to the seat base 14, the user releases the handle 48 and the biasing member 120 biases the handle 48 back to a locked position. The movement of the handle 48 causes the second notched portion 76 of the first pawl member 40 and the second notched portion 78 of the second pawl member 42 to rotate in the opposite direction of the arrows shown in FIG. 3 to cause the first and second pawl member 40 and 42 to engage the sector gear member 28. Once the first and second pawl members 40 and 42 are locked with the sector 28, as shown in FIG. 4, the recliner mechanism 10 is in a second locked position and the seat back 12 is in a reclined position compared to the position shown in FIG. 2. Accordingly, a user of the seat may adjust the position of the seat back 12 with respect to the seat base 14 at a variety of locations simply by activating the recliner mechanism 10 using the handle 48.

It should be understood that it is possible to provide additional linkages of any known variety or type in order to activate the recliner mechanism 10. Similarly, it should be understood that the handle 48 can be translated or moved to the second operating member 52 or otherwise employed to operate the recliner mechanism 10. Further, is it possible to simply add a motor and appropriate electronics for powered actuation of the recliner mechanism 10.

While the preferred embodiments of the invention have been described, it will be understood by those skilled in the art to which the invention pertains that numerous modifications and changes may be made without departing from the true spirit and scope of the invention. It is accordingly intended to define the scope of the invention precisely in the claims appended to and forming a part of this application.

What is claimed is:

1. A recliner mechanism for adjusting the position of a seat back frame assembly with respect to a seat base frame assembly, the recliner mechanism comprising:
    a sector member having a plurality of teeth located on an edge of the sector member, the sector member being connected to at least one of the seat back frame assembly and the seat base frame assembly;
    a first pawl member having a notched edge portion located between a proximal end and a distal end, the first pawl member being connected to the other of the seat back frame assembly and the seat base frame assembly from the sector member;
    a second pawl member having a notched edge portion located between a proximal end and a distal end, wherein the proximal end of the first pawl member is rotably connected to the proximal end of the second pawl member and the second pawl member is connected to the other of the seat back frame assembly and the seat base frame assembly from the sector member; and
    wherein the first and second pawl members are aligned with the sector member such that the notched edge portions of the first and second pawl members engage the plurality of teeth of the sector member and wherein the first and second distal end move at the same time.

2. The recliner mechanism of claim 1, wherein the sector member is connected to the seat base frame assembly and the first and second pawl members are connected to the a seat back frame assembly.

3. The recliner mechanism of claim 1 wherein the notched edge portions of the first and second pawl members include a plurality of varying shape teeth.

4. The recliner mechanism of claim 3 further comprising wherein the notched edge portions of the first and second pawl members comprise:
    a first portion having a plurality of low profile teeth;
    a second portion having a plurality of normal profile teeth, the normal profile teeth being larger in size than the low profile teeth; and
    a third portion having a plurality of angled profile teeth.

5. The recliner mechanism of claim 3 further comprising a means for moving the distal ends of the first and second pawl members such that the notched edge portions of the first and second pawl members are moved into and out of engagement with the plurality of teeth on the sector member.

6. The recliner mechanism of claim 3 further comprising a first cam pin member connected to the distal end of the first pawl member and a second cam pin member connected to the distal end of the second pawl member, the first and second cam pin members each having a first axis of rotation and a second axis of rotation offset from the first axis of rotation such that rotation of the first and second cam pin members causes the first and second pawl members to rotate in opposite directions about their proximal ends.

7. The recliner mechanism of claim 6 wherein the first cam pin member an the second cam pin member each have ends journaled in the seat back frame member.

8. The recliner mechanism of claim 6 wherein the first cam pin member has a cam lobe having a constant radius about the second axis of rotation of the first cam pin member, and the second cam pin member has a cam lobe having a constant radius about the second axis of rotation of the second cam pin member.

9. The recliner mechanism of claim 8, wherein each cam lobe includes a plurality of teeth located along the constant radius cam lobe for meshing with the plurality of teeth of the other cam lobe such that rotation of one cam pin member will cause the opposite rotation of the other cam pin member.

10. The recliner mechanism of claim 6 wherein the first cam pin member has a cam lobe having a plurality of teeth located about the second axis of rotation of the first cam pin member, and the second cam pin member has a cam lobe having a plurality of teeth located about the second axis of rotation of the second cam pin member; and wherein the plurality of teeth of the cam lobes mesh such that rotation of one cam pin member will cause the opposite rotation of the other cam pin member whereby the first and second pawl members rotate about their proximal ends in opposite directions when the one of the first and second cam pin members is rotated.

11. The recliner mechanism of claim 10 further comprising a lever member connected to one of the first and second cam pin members.

12. The recliner mechanism of claim 10 further comprising a biased lever member connected to one of the first and second cam pin members, wherein the lever member is biased into a first position in which first and second pawl members engage the sector member and the seat back frame assembly can not be rotated with respect to the seat base frame assembly.

13. The recliner mechanism of claim 10 further comprising a lever member connected to one of the first and second cam pin members, and a spring connected to the lever member for biasing the lever member toward a first position in which first and second pawl members engage the sector member and the seat back frame member can not be rotated with respect to the seat base.

14. The recliner mechanism of claim 6 further comprising a lever member connected to one of the first and second cam pin members.

15. The recliner mechanism of claim 1 wherein the notched edge portions of the first and second pawl members comprise:
    a first portion having a plurality of low profile teeth;
    a second portion having a plurality of normal profile teeth, the normal profile teeth being larger in size than the low profile teeth; and
    a third portion having a plurality of angled profile teeth.

16. A recliner mechanism for adjusting the position of a seat back frame assembly with respect to a seat base frame assembly, the recliner mechanism comprising:
- a round sector member having a plurality of teeth located on an edge of the round sector member;
- a first pawl member having a notched edge portion located between a proximal end and a distal end;
- first cam pin member having first and second axes of rotation, wherein the first cam pin member is rotatably connected to the distal end of the first pawl member;
- a second pawl member having a notched edge portion located between a proximal end and a distal end, wherein the proximal end of the first pawl member is rotatably connected to the proximal end of the second pawl member and the second pawl member is connected to the other of the seat back frame assembly and the seat base frame assembly from the round sector member;
- a second cam pin member having first and second axes of rotation, wherein the second cam pin member is rotatably connected to the seat back frame assembly for rotation about the first axis of rotation and is rotatably connected to the distal end of the second pawl member;
- wherein the first and second cam pin members are connected such that rotation of the first and second cam pin members causes first and second pawl members to rotate in opposite directions about their proximal ends;
- wherein the first and second pawl members are aligned with the round sector member such that the notched edge portions of the first and second pawl members engage the plurality of teeth of the round sector member.

17. The recliner mechanism of claim 16 wherein the round sector member includes a passage, the recliner mechanism further comprising:
- a pivot pin fixed to the seat back frame assembly; and
- a deformable bushing located in the passage in the round sector member, the deformable bushing having a first passage having the pivot pin located therein.

18. The recliner mechanism of claim 16 wherein the round sector member is connected to the seat base frame assembly and thither includes a centrally located passage, the recliner mechanism further comprising a pivot pin fixed to the seat back frame assembly and passing through the passage in the round sector member.

19. A recliner mechanism, comprising:
- a round sector member having an edge with a plurality of teeth and connected to at least one of a seat back frame and a seat base frame;
- a first pawl member having a notched edge portion located between a first and second end and being connected to the other of the seat back frame and the seat base frame;
- a second pawl member having a notched edge portion located between a first end and a second end, wherein the first end of the first pawl member is rotatably connected to the first end of the second pawl member and the second pawl member is connected to the other of the seat back frame and the seat base frame;
- the first and second pawl members are aligned with the round sector member such that the notched edge portions of the first and second pawl members; and
- a first cam pin member connected to the second end of the first pawl member and a second cam pin member connected to the second end of the second pawl member, so that rotation of the first and second cam pin members causes the first and second pawl members to rotate in opposite directions about their proximal ends to releasably engage the first and second pawl members with the plurality of teeth of the round sector member.

20. The recliner mechanism of claim 19 further comprising a lever member connected to one of the first and second cam pin members.

* * * * *